(12) United States Patent
Nashizawa et al.

(10) Patent No.: US 7,796,298 B2
(45) Date of Patent: Sep. 14, 2010

(54) IMAGE PROCESSING METHOD, IMAGE PROCESSING APPARATUS, AND STORAGE MEDIUM

(75) Inventors: Hiroaki Nashizawa, Tokyo (JP); Hayato Kubo, Chiba (JP); Naoto Ueno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 11/759,020

(22) Filed: Jun. 6, 2007

(65) Prior Publication Data

US 2007/0285692 A1 Dec. 13, 2007

(30) Foreign Application Priority Data

Jun. 8, 2006 (JP) ............................. 2006-160314

(51) Int. Cl.
*G06F 15/00* (2006.01)
*H04N 1/60* (2006.01)
*G06K 15/00* (2006.01)

(52) U.S. Cl. ........................................ 358/1.9; 358/518
(58) Field of Classification Search ................. 358/500, 358/501, 504, 518, 520, 523, 1.1, 1.9, 2.1, 358/3.23
See application file for complete search history.

(56) References Cited

U.S. PATENT DOCUMENTS

| 6,760,108 B2* | 7/2004 | Ohga | 356/406 |
| 7,010,161 B2* | 3/2006 | Kanai | 382/167 |

FOREIGN PATENT DOCUMENTS

JP 2002-094811 3/2002

* cited by examiner

*Primary Examiner*—Thomas D Lee
(74) *Attorney, Agent, or Firm*—Fitzpatrick, Cella Harper & Scinto (57) ABSTRACT

In generating a conversion characteristic look-up table between an output device dependence color space and device independence color space, when white and black correction is performed for a colorimetric value of a sample chart output from an output device, the values of the chromaticity components of the white point of the colorimetric value are maintained even after the correction. In addition, the conversion characteristic look-up table is generated such that only a corrected white point is corrected to a reference white point so as to make the reference white point smoothly continue to other grid points.

5 Claims, 10 Drawing Sheets

Dst

IMAGE PROCESSING METHOD, IMAGE PROCESSING APPARATUS, AND STORAGE MEDIUM

BACKGROUND OF THE INVENTION

1. Field of the Invention

The present invention relates to an image processing method and image processing apparatus and, more particularly, to an image processing method and image processing apparatus which generate a conversion characteristic look-up table between input and output devices, that is referred to in a color matching process.

2. Description of the Related Art

Figure 1:
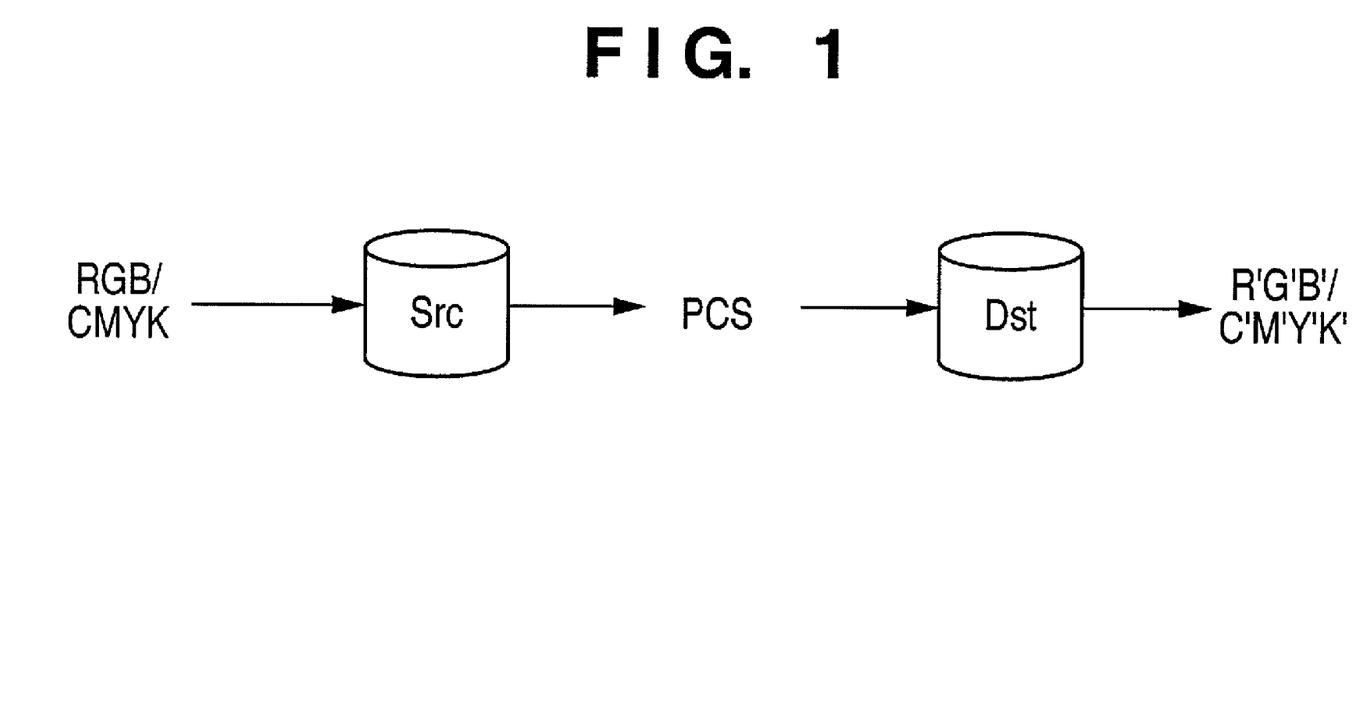
FIG. 1 is a conceptual view of general color matching between different devices.

FIG. 1 is a conceptual view of general color matching between different devices. Referring to FIG. 1, when RGB or CMYK data as a device dependence image data value is input, the input data is converted into XYZ or L*a*b* data (under the PCS condition to be described later) on a device independence color space by a source profile Src. The input data converted into data on the device independence color space undergoes color space compression so that all colors fall within the color gamut of an output device. This compression is performed because an output device does not express colors outside its color gamut. After color space compression, the input data is converted from the data on the device independence color space into R'B'G' or C'M'Y'K' data on a color space dependent on the output device. This color space compression and conversion into the output device values are performed by a destination profile Dst.

In conventional color matching, a reference white point and ambient light are fixed by International Color Consortium (ICC) and the like. For example, in profiles specified by ICC, the Profile Connection Space (PCS) that connects profiles is defined by XYZ values and L*a*b* values of the D50 reference. For this reason, upon viewing an input document or printout under a light source with the D50 characteristics, correct color reproduction is guaranteed. Under light sources with other characteristics, however, correct color reproduction is not guaranteed.

Upon observing an identical output product under different light sources, XYZ values relative to the output product observed under the different light sources look different from each other. Various transform methods are known for predicting XYZ values under different light sources. As such transform methods, (1) ratio conversion, (2) Von Kries transform, and (3) a prediction formula based on a color appearance model will be described below.

(1). Ratio Conversion

The ratio conversion is a method of performing W2/W1 ratio conversion so as to convert XYZ values under reference white point W1 into those under reference white point W2. When this method is applied to an L*a*b* uniform color space, L*a*b* values under reference white point W1 match those under reference white point W2. For example, let (X1,Y1,Z1) be the XYZ values of an output product under reference white point W1(Xw1,Yw1,Zw1), and (X2,Y2,Z2) be the XYZ values of an output product under reference white point W2(Xw2,Yw2,Zw2). Then, according to the ratio conversion, we have:

$$X2=(Xw2/Xw1)\cdot X1$$

$$Y2=(Yw2/Yw1)\cdot Y1$$

$$Z2=(Zw2/Zw1)\cdot Z1$$

(2) Von Kries Transform

The Von Kries transform is a method of performing W2'/W1' ratio conversion on the human color perception space PQR so as to convert XYZ values under reference white point W1 into those under reference white point W2. When this method is applied to an L*a*b* uniform color space, L*a*b* values under reference white point W1 do not match those under reference white point W2. For example, let (X1,Y1,Z1) be the XYZ values of an output product under reference white point W1(Xw1,Yw1,Zw1), and (X2,Y2,Z2) be the XYZ values of an output product under reference white point W2(Xw2,Yw2,Zw2). Then, according to the Von Kries transform, we have:

$$\begin{bmatrix} X2 \\ Y2 \\ Z2 \end{bmatrix} = [M^{-1}] \begin{bmatrix} \frac{P_2}{P_1} & 0 & 0 \\ 0 & \frac{Q_2}{Q_1} & 0 \\ 0 & 0 & \frac{R_2}{R_1} \end{bmatrix} [M] \begin{bmatrix} X1 \\ Y1 \\ Z1 \end{bmatrix}$$

where $P_1$, $P_2$, $Q_1$, $Q_2$, $R_1$, and $R_2$, have a relationship expressed by:

$$\begin{bmatrix} P_1 \\ Q_1 \\ R_1 \end{bmatrix} = [M] \begin{bmatrix} Xw1 \\ Yw1 \\ Zw1 \end{bmatrix}$$

$$\begin{bmatrix} P_2 \\ Q_2 \\ R_2 \end{bmatrix} = [M] \begin{bmatrix} Xw2 \\ Yw2 \\ Zw2 \end{bmatrix}$$

(3) Prediction Formula Based on a Color Appearance Model

The prediction formula based on a color appearance model is a method of exploiting a human color perception space QMH (or JCH) like CIE CAM97s so as to convert XYZ values under observation condition VC1 (including W1) into those under observation condition VC2 (including W2). Note that Q of QMH represents the brightness; M, the colorfulness; and H, the huequadrature or hueangle. Also, J of JCH represents the lightness; C, the chroma; and H, the huequadrature or hueangle.

For example, let (X1,Y1,Z1) be the XYZ values of a sample under reference white point W1(Xw1,Yw1,Zw1), and (X2,Y2,Z2) be the XYZ values of a sample under reference white point W2(Xw2,Yw2,Zw2). Then, according to the prediction formula based on a color appearance model, conversion is performed such as (X1,Y1,Z1)→[CIE CAM97s forward conversion]→(Q,M,H), or (J,C,H)→[CIE CAM97s inverse conversion]→(X2,Y2,Z2).

The above-described methods are available when the output product is expressed on an ideal medium (a medium on which a white point corresponds to perfect reflection, and a black point corresponds to perfect absorption). In practice, since situations differ depending on media to be used, Japanese Patent Laid-Open No. 2002-094811 discloses a method of matching human color perception between media having different white points or black points. More specifically, when the Von Kries transform is expanded and an effect by a cone response (Pk, Qk, Rk) to a black point under a light source IA and a cone response (Pk',Qk',Rk') to a black point under a light source IB is considered, we have:

$$(P-Pk)/(Pw-Pk)=(P'-P'k)/(P'w-P'k)$$

$$(Q-Qk)/(Qw-Qk)=(Q'-Q'k)/(Q'w-Q'k)$$

$$(R-Rk)/(Rw-Rk)=(R'-R'k)/(R'w-R'k)$$

When this is applied to a method of converting media white and black points to the PCS (D50), a color appearance model which makes human visual perception adaptable to the media white and black points is derived. More specifically, the relationship between an output product (X1,Y1,Z1) on a medium and an output product (X2,Y2,Z2) on the PCS is expressed as follows by using, for example, the Von Kries transform as a chromatic adaptation model. Let MW1(Xmw1,Ymw1, Zmw1) be the medium white point, MK1(Xmk1,Ymk1, Zmk1) be the medium black point, IW2(Xiw2,Yiw2,Ziw2) be the white point D50 on the PCS, and IK2(Xik2,Yik2,Zik2) be the black point on the PCS. Then, we have:

$$\begin{bmatrix} X2 \\ Y2 \\ W2 \end{bmatrix} = [M^{-1}] \begin{bmatrix} (P_{2w}-P_{2k}) \cdot \left( \dfrac{P-P_{1k}}{P_{1w}-P_{1k}} \right) + P_{2k} \\ (Q_{2w}-Q_{2k}) \cdot \left( \dfrac{Q-Q_{1k}}{Q_{1w}-Q_{1k}} \right) + Q_{2k} \\ (R_{2w}-R_{2k}) \cdot \left( \dfrac{R-R_{1k}}{R_{1w}-R_{1k}} \right) + R_{2k} \end{bmatrix}$$

where P, $P_{1w}$, $P_{1k}$, $P_{2w}$, $P_{2k}$, Q, $Q_{1w}$, $Q_{1k}$, $Q_{2w}$, $Q_{2k}$, R, $R_{1w}$, $R_{1k}$, $R_{2w}$, and $R_{2k}$, have a relationship expressed by:

$$\begin{bmatrix} P \\ Q \\ R \end{bmatrix} = [M] \begin{bmatrix} X1 \\ Y1 \\ Z1 \end{bmatrix}$$

$$\begin{bmatrix} P_{1w} \\ Q_{1w} \\ R_{1w} \end{bmatrix} = [M] \begin{bmatrix} Xmw1 \\ Ymw1 \\ Zmw1 \end{bmatrix}$$

$$\begin{bmatrix} P_{1k} \\ Q_{1k} \\ R_{1k} \end{bmatrix} = [M] \begin{bmatrix} Xmk1 \\ Ymk1 \\ Zmk1 \end{bmatrix}$$

$$\begin{bmatrix} P_{2w} \\ Q_{2w} \\ R_{2w} \end{bmatrix} = [M] \begin{bmatrix} Xiw2 \\ Yiw2 \\ Ziw2 \end{bmatrix}$$

$$\begin{bmatrix} P_{2k} \\ Q_{2k} \\ R_{2k} \end{bmatrix} = [M] \begin{bmatrix} Xik2 \\ Yik2 \\ Zik2 \end{bmatrix}$$

According to the technique described above, a profile can be generated by using white point correction and black point correction corresponding to the medium white point and black point. With this process, color conversion can be performed so as to match the grayscales (color sequences that couple white and black points) on different media on the human color perception space, and the color matching closer to the human color perception can be implemented.

However, the relative color matching using the profile undergone white and black correction of the conventional method has the following problem when the degree of whiteness of the paper white (ground color of the medium) is significantly different between the source side and destination side. Particularly, when the white points of the input and output media are on opposite sides with respect to the L* axis on the L*a*b* color space, the matching precision particularly deteriorates on the gray line.

A case wherein the precision on the gray line deteriorates will be described. For example, assume that a conversion from the input device dependence color space to the device independence color space is performed based on the source profile Src on the input side by the conventional white and black correction method as shown FIG. 2. Assume also that a conversion from the device independence color space to the output device dependence color space is performed based on the destination profile Dst on the output side, as an inverse conversion shown in FIG. 3. The color matching process by the combination of such input and output is performed as shown in FIG. 4. Note that the ordinate represents an L* plane, and the abscissa represents an a*b* plane in FIGS. 2, 3, and 4.

With reference to FIG. 4, reference white point W1(e.g., CMYK=0,0,0,0→L*a*b*=90.1,−0.11,1.69) of the input side is converted into reference white point W(L*a*b*=100,0,0) on the PCS by the source profile Src. W(L*a*b*=100,0,0) is converted into CMYK=0,0,0,0 by the destination profile Dst and output. However, CMYK=0,0,0,0 on the destination becomes, for example, reference white point W2(L*a*b*=95.4,−2.13,−4.50) of the output side before white and black correction, in practice.

As shown in FIG. 4, when the white point is greatly moved by color matching, the gray line (a line which couples the white point and black point) also moves greatly, therefore the matching precision of the image to be output in practice with respect to the input image data deteriorates.

SUMMARY OF THE INVENTION

The present invention is directed to an image processing method and image processing apparatus which generate a conversion characteristic look-up table between input and output devices so that color matching with high precision close to human color perception is implemented between media having different white points, and a storage medium thereof.

An image processing method according to an aspect of the present invention includes a color measurement step of colorimetrically measuring a chart of a device dependence color signal output by an output device so as to obtain a first device independence color signal, a white and black correction step of performing white and black correction for the first device independence color signal to obtain a second device independence color signal, and a conversion characteristic look-up table generation step of generating a conversion characteristic look-up table based on the device dependence color signal and the second device independence color signal, wherein in the white and black correction step, white and black correction is performed so as to maintain a chromaticity component of a white point of the first device independence color signal in the second device independence color signal.

An image processing apparatus as according to another aspect of the present invention includes a color measurement unit configured to colorimetrically measure a chart of a device dependence color signal output by an output device so as to obtain a first device independence color signal, a white and black correction unit configured to perform white and black correction for the first device independence color signal to obtain a second device independence color signal, and a conversion characteristic look-up-table generation unit configured to generate a conversion characteristic look-up table based on the device dependence color signal and the second device independence color signal, wherein the white and black correction unit performs white and black correction so as to maintain a chromaticity component of a white point of the first device independence color signal in the second device independence color signal, in a computer-readable form, a computer program that realizes an image processing method, wherein the computer program causes a computer to execute:

A storage medium according to still another aspect of the present invention storing, in a computer-readable form, a computer program that realizes an image processing method, wherein the computer program causes a computer to execute a color measurement step of colorimetrically measuring a chart of a device dependence color signal output by an output device so as to obtain a first device independence color signal, a white and black correction step of performing white and black correction for the first device independence color signal to obtain a second device independence color signal, and a conversion characteristic look-up-table generation step of generating a conversion characteristic look-up table based on the device dependence color signal and the second device independence color signal, wherein in the white and black correction step, white and black correction is performed so as to maintain a chromaticity component of a white point of the first device independence color signal in the second device independence color signal.

Further features of the present invention will become apparent from the following description of exemplary embodiments (with reference to the attached drawings).

DESCRIPTION OF THE EMBODIMENTS

Preferred embodiments of the present invention will be described hereinafter with reference to the accompanying drawings. Note that the arrangements shown in the following embodiments are examples, and the present invention is not limited to the arrangements shown in the drawings.

<System Configuration>

Figure 5:
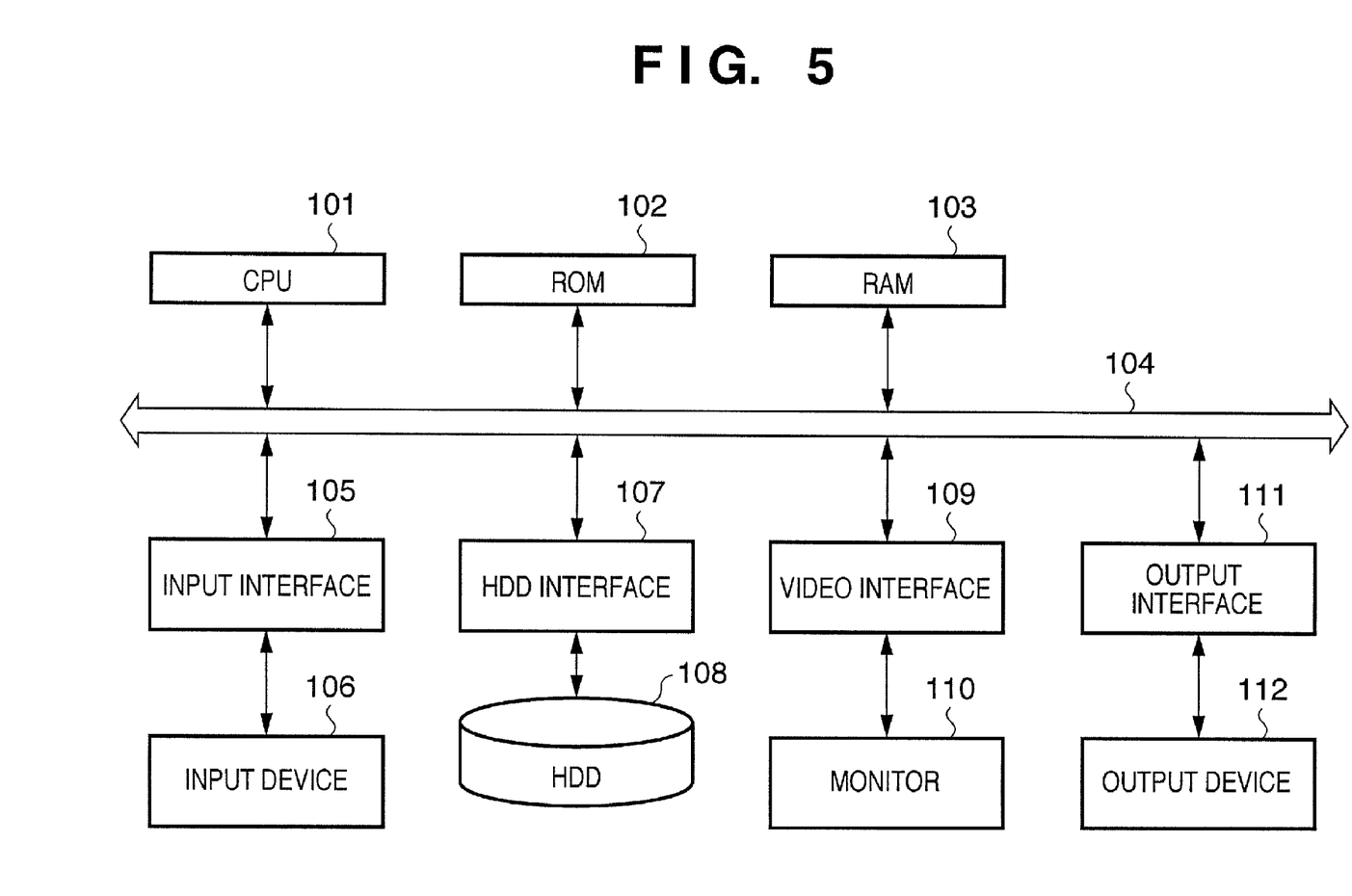
FIG. 5 is a block diagram showing the system configuration used in an embodiment of the present invention.

FIG. 5 is a block diagram showing an example of the system configuration used in the present embodiment. Referring to FIG. 5, reference numeral 101 denotes a CPU (Central Processing Unit), and reference numeral 102 denotes a read-only memory (ROM). The ROM 102 is connected to the CPU 101 together with a random access memory (RAM) 103 via a bus 104. The CPU 101 can directly execute a program stored in the ROM 102 or RAM 103. An input interface 105, HDD interface 107, video interface 109, and output interface 111 are connected to the bus 104.

The CPU 101 can read unique information of an input device 106 such as a keyboard, mouse, and spectrophotometer via the input interface 105. A secondary storage device (HDD) 108 such as a hard disk device or optical disk device can be read and written via the HDD interface 107.

Data stored in the HDD 108 can be mapped on the RAM 103 by using an appropriate method. Likewise, data mapped on the RAM 103 can be stored in the HDD 108 by using an appropriate method. The CPU 101 can regard the data from HDD 103 mapped on the RAM 103 as a program and execute it.

The CPU 101 operates the video interface 109 to display an arbitrary text or image in a monitor 110. The CPU 101 can transmit information to an output device 112 such as a printer or plotter via the output interface 111. The CPU 101 can read device information unique to a printer, such as the model name and gamut information of the output device 112, via the output interface 111, as in the input device 106.

<Generation of Color Signal Conversion Characteristic Look-Up Table>

In this embodiment, the CPU 101 executes a program mapped on the RAM 103 to convert a device dependence color signal into a device independence color signal. At this time, a conversion characteristic look-up table (grid point data in a profile) generated in advance is referred to.

A conversion characteristic look-up table in the present embodiment will be described below. First, with reference FIG. 6, a general arrangement for generating a conversion characteristic look-up table for converting a device dependence color signal into a device independence color signal will be described.

[General Generation Method]

Figure 6:
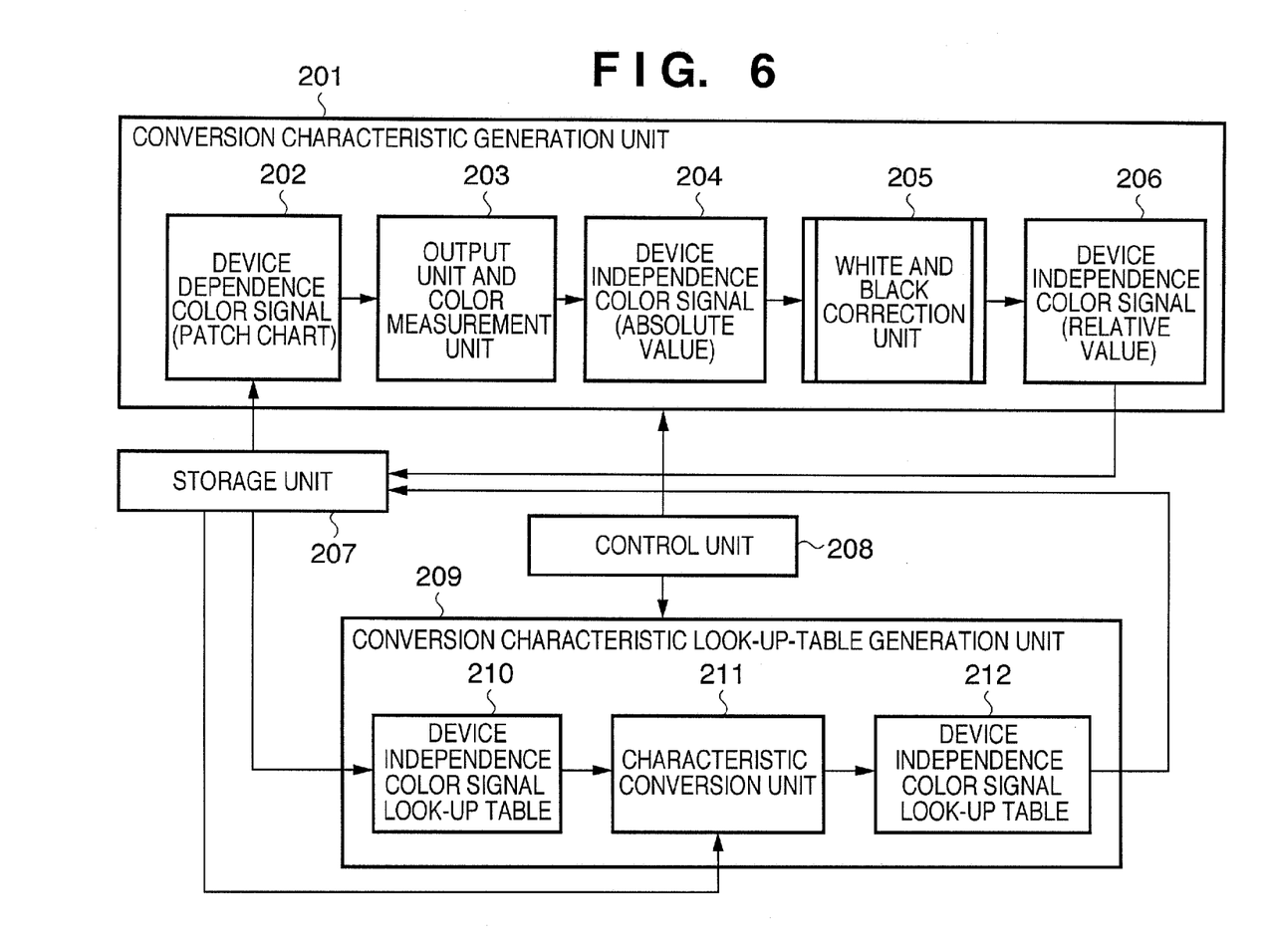
FIG. 6 is a block diagram showing a general arrangement for generating a conversion characteristic look-up table for converting a device dependence color signal into a device independence color signal.

Referring to FIG. 6, a control unit 208 makes a conversion characteristic generation unit 201 generate basic conversion characteristics (e.g., a look-up table (LUT) or model expressions).

The conversion characteristic generation unit 201 reads out a patch chart 202 of the device dependence color signal from a storage unit 207. An output unit and color measurement unit 203 outputs the patch chart 202 onto a printing sheet via the output device 112, and the input device 106 colorimetrically measures the output patch chart to obtain a device independence color signal (absolute value) 204. As an example of the patch chart, a CMYK 928 color such as IT8.7/3 and the like can be assumed. As the spectrophotometer, which performs photometry, can be a 3-channel colorimetric analysis sensor type, spectrophotometer sensor type, and the like. Although the spectrophotometer sensor type has a higher precision than the 3-channel colorimetric analysis sensor type, the cost is also high.

The device independence color signal (absolute value) 204 obtained in the output unit and color measurement unit 203 is converted into a device independence color signal (relative value) 206 by a white and black correction unit 205. As an example of the relative value on the PCS having L*a*b* values defined by ICC, a media white point becomes L*a*b*=100,0,0", and the like.

In this manner, the conversion characteristic generation unit 201 generates the conversion characteristics from a device independence color signal to a device independence color signal and stores it in the storage unit 207.

A conversion characteristic look-up table generation unit 209 generates conversion characteristics used for color matching in practice, based on the conversion characteristics stored in the storage unit 207. First, the conversion characteristic look-up table generation unit 209 reads out a device dependence color signal look-up table 210 (e.g., 9×9×9 RGB points or 9×9×9 CMYK points) from the storage unit 207. A characteristic conversion unit 211 performs characteristic conversion for the device dependence color signal look-up table 210 based on the conversion characteristics read from the storage unit 207 to derive a device independence color signal look-up table 212. With this process, a device dependence color signal to device independence color signal conversion characteristic look-up table can be obtained. In calculation of the conversion characteristic look-up table, for example, simple conversion characteristics (e.g., 9×9×9 points) read from the storage unit 207 are interpolated so as to obtain the more detailed conversion characteristic look-up table.

Generation Method of Present Embodiment

A conversion characteristic look-up table in the present embodiment is basically generated as shown in FIG. 6. Note that, in the present embodiment, color matching for reducing a shift of the gray line is available when the white points of input and output media are largely separated from each other. For this reason, the white and black correction unit 205, which converts a device independence color signal from an absolute value into a relative value, has a special structure. The structure of the white and black correction unit 205 in the present embodiment will be described in detail hereinafter with reference to FIG. 7.

Figure 7:
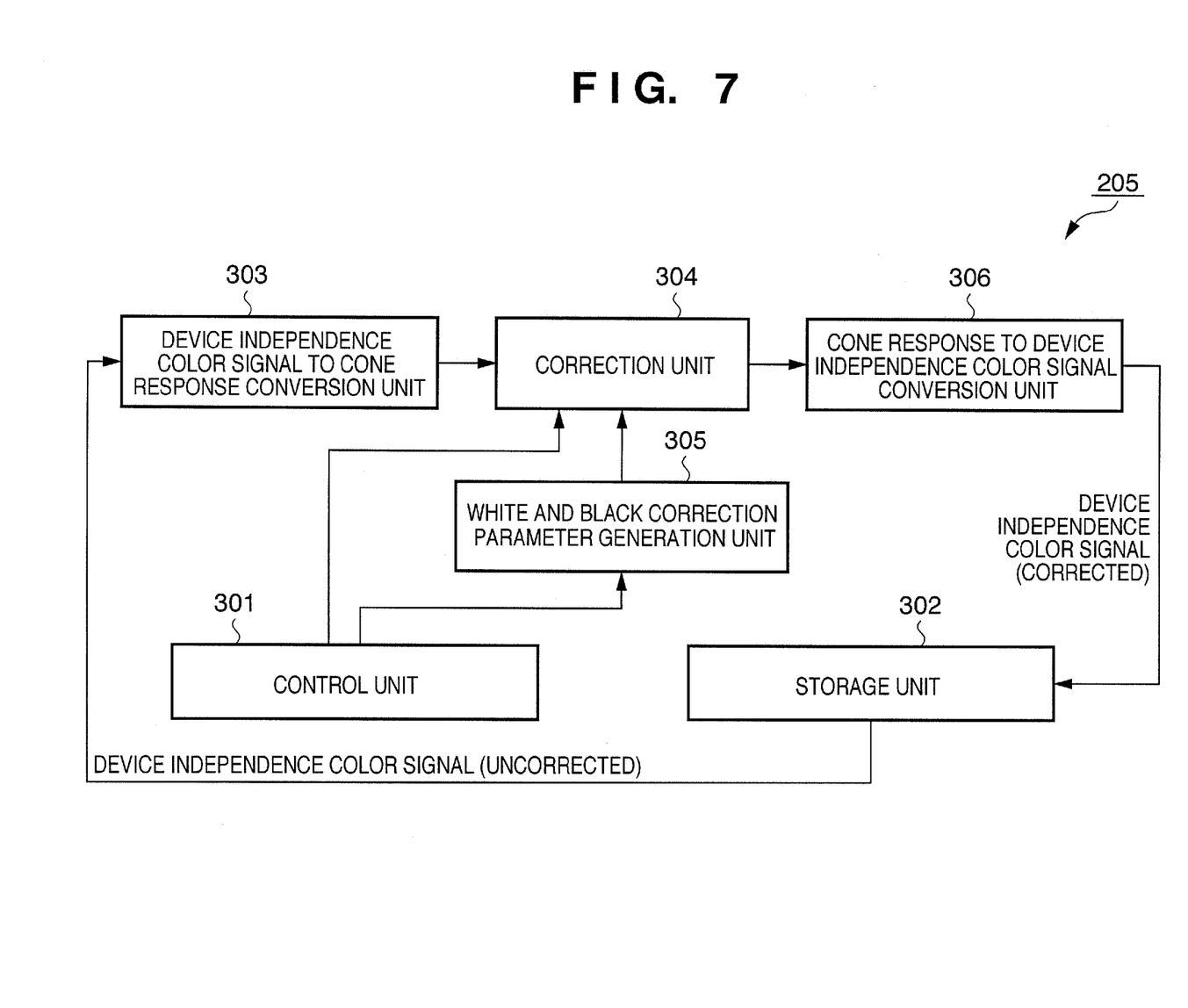
FIG. 7 is a block diagram showing the structure of a white and black correction unit according to the present embodiment.

In FIG. 7, an uncorrected device independence color signal (absolute value) read from a storage unit 302 is converted into a cone response signal by a device independence color signal to cone response conversion unit 303 and transmitted to a correction unit 304. Conversion from the device independence color signal into a cone response signal is performed by a linear conversion using a 3×3 matrix M which utilizes the Von Kries chromatic adaptation model. As the matrix M, the chromaticity coordinates of the primary colors with the basic spectral sensitivity, derived by Pitt and Esteves, may be used.

A white and black correction parameter generation unit 305 generates various parameters. The white and black correction parameter generation unit 305 generates four white and black correction parameters for determining the correction direction: an uncorrected white point OW, uncorrected black point OB, corrected white point NW, and corrected black point NB in a cone response signal. The correction unit 304 performs white and black correction for the input cone response signal, based on these white and black correction parameters, and outputs the corrected signal.

A cone response to device independence color signal conversion unit 306 converts the cone response signal that underwent the white and black correction into a device independence color signal, and stores it in the storage unit 302 as a corrected device independence color signal (relative value).

The parameters in the white and black correction parameter generation unit 305 will be described in detail below.

Generally, since ICC color matching converts an input color signal into an output color signal via the PCS, the input side is unknown for the output side in principle. Assume that a profile of the output side is generated under this condition.

Figure 2:
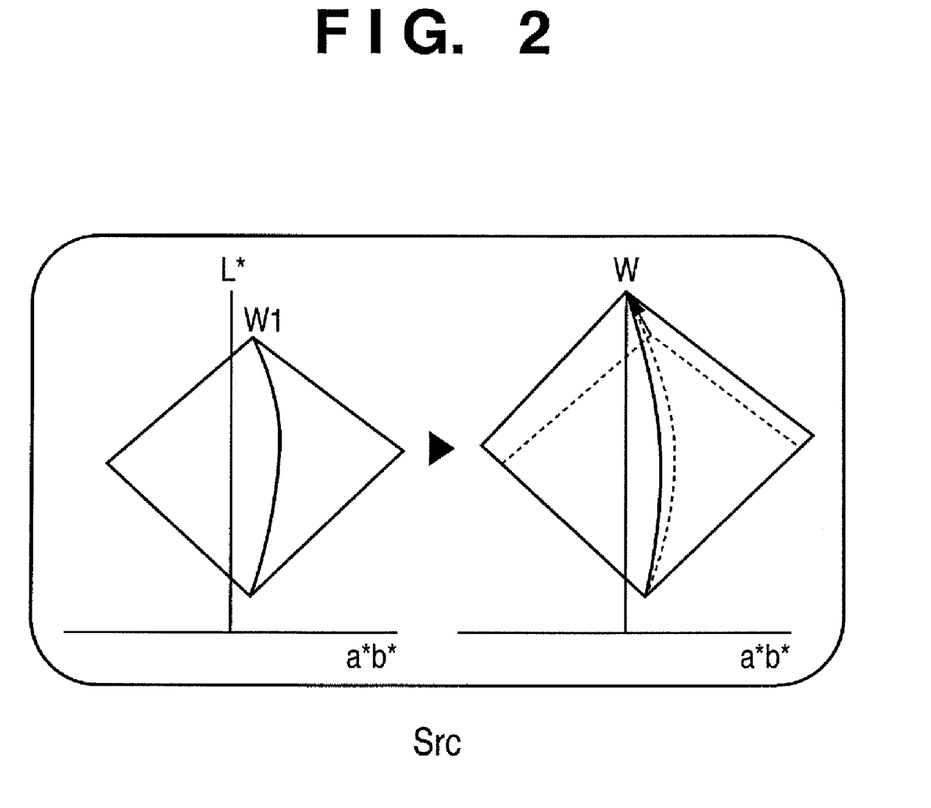
FIG. 2 is a view showing a general white and black correction.
Figure 3:
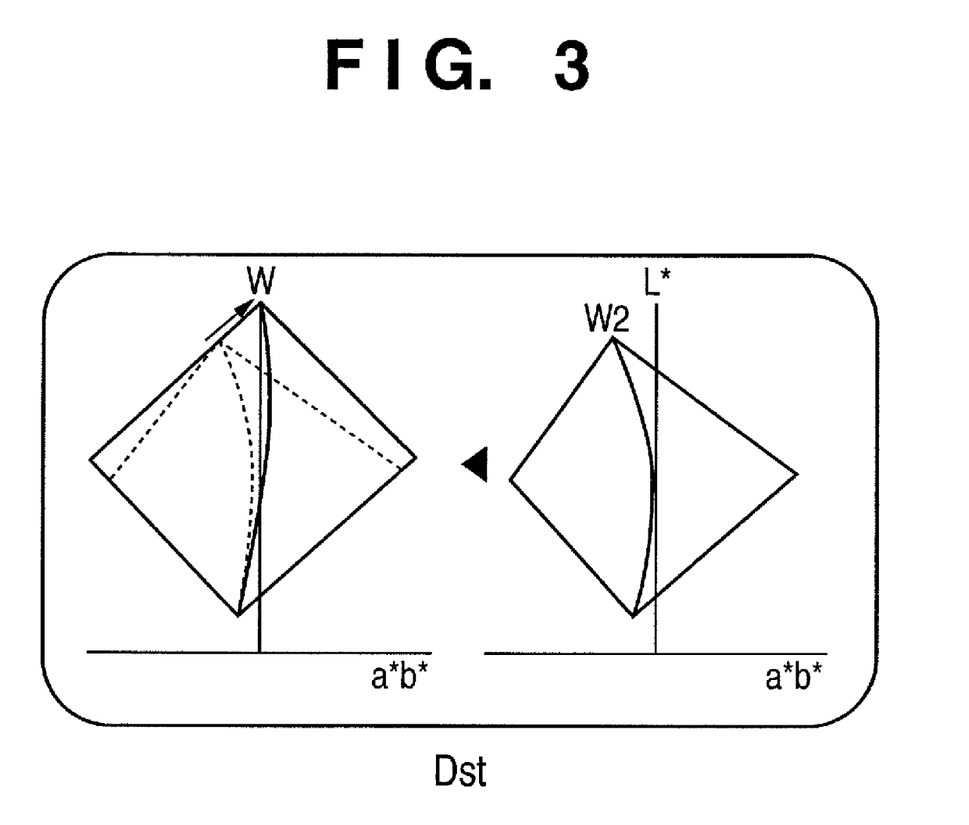
FIG. 3 is a view showing the general white and black correction.
Figure 4:
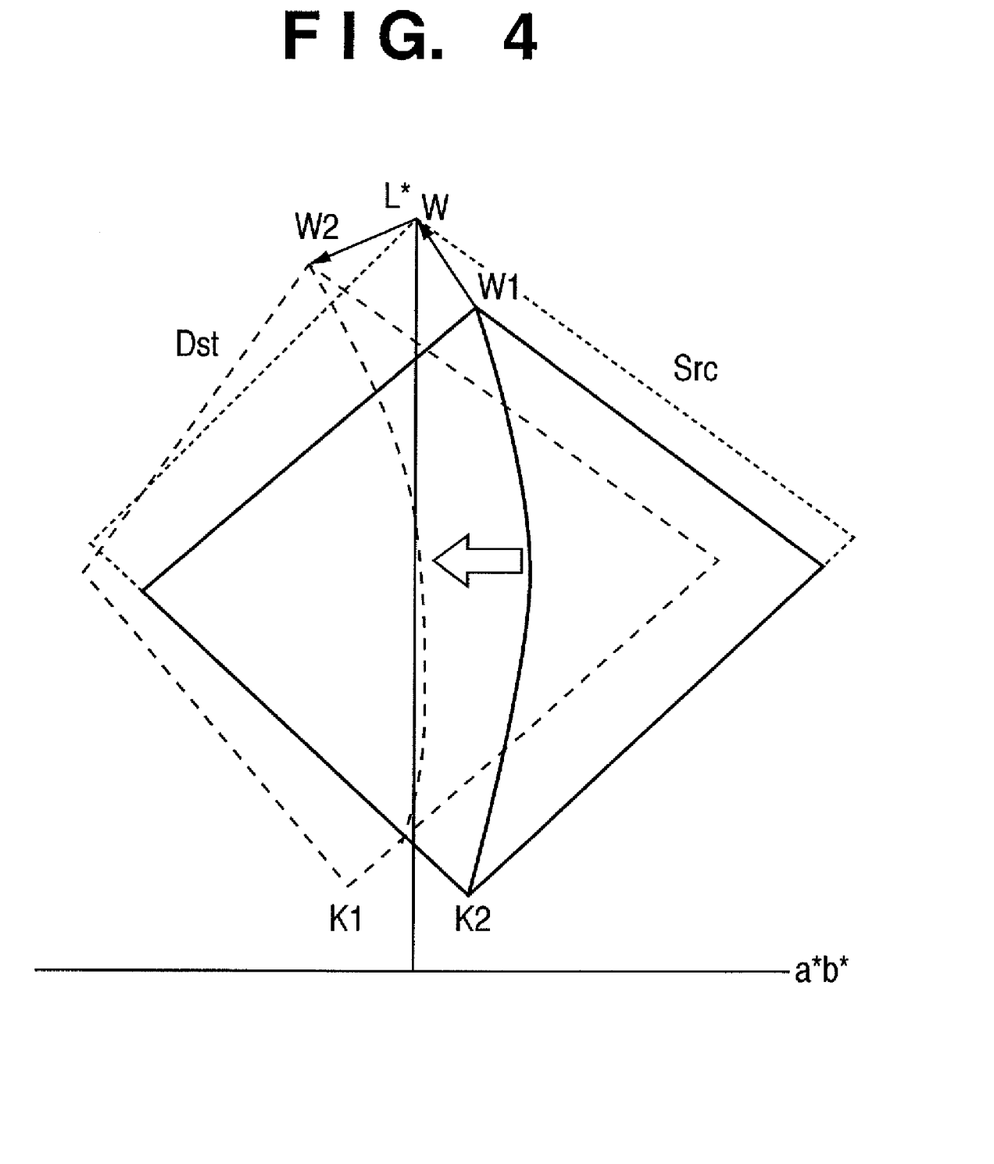
FIG. 4 is a view showing color matching performed when white points of input and output media are separated from each other.
Figure 8:
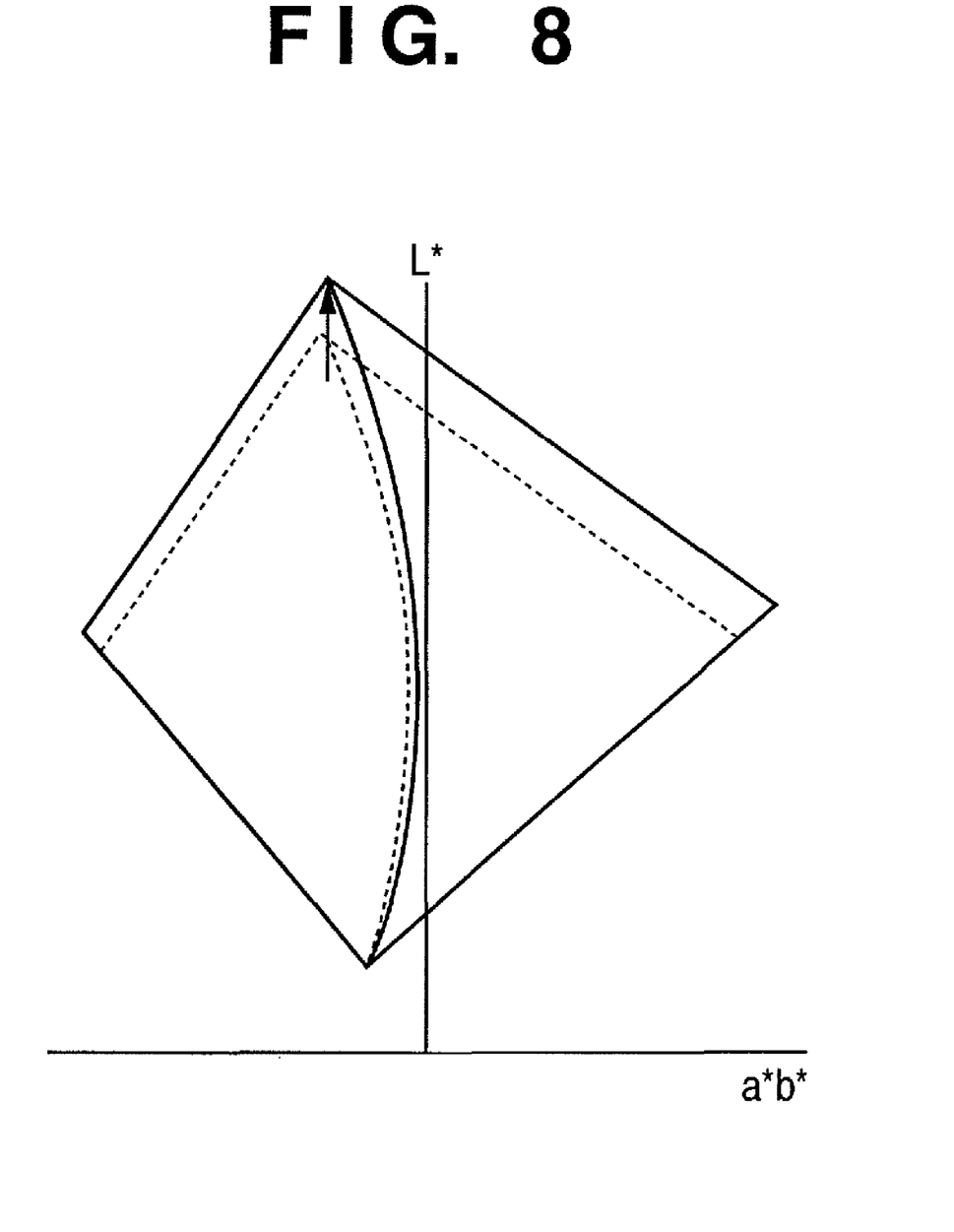
FIG. 8 is a view showing the black and white correction according to the present embodiment.

In the present embodiment, the uncorrected white point OW is corrected not to L*a*b*=100,0,0 as shown in FIGS. 2 and 3 but, basically, only in the L* axis direction, that is, to L*a*b*=100,OWa*,OWb*, as shown in FIG. 8. In this case, OWa* and OWb* are the a* value and b* value, respectively, of the uncorrected white point.

As described above, in the present embodiment, since the chromaticity coordinates of the corrected white point parameter are set the same as those of the uncorrected white point upon white and black correction, the correction amount becomes a minimum, and thus a stable precision can be obtained in ICC color matching. Hence, even when uncorrected white points OW with various tinctures are input, a shift of the gray line after correction is small.

Figure 9:
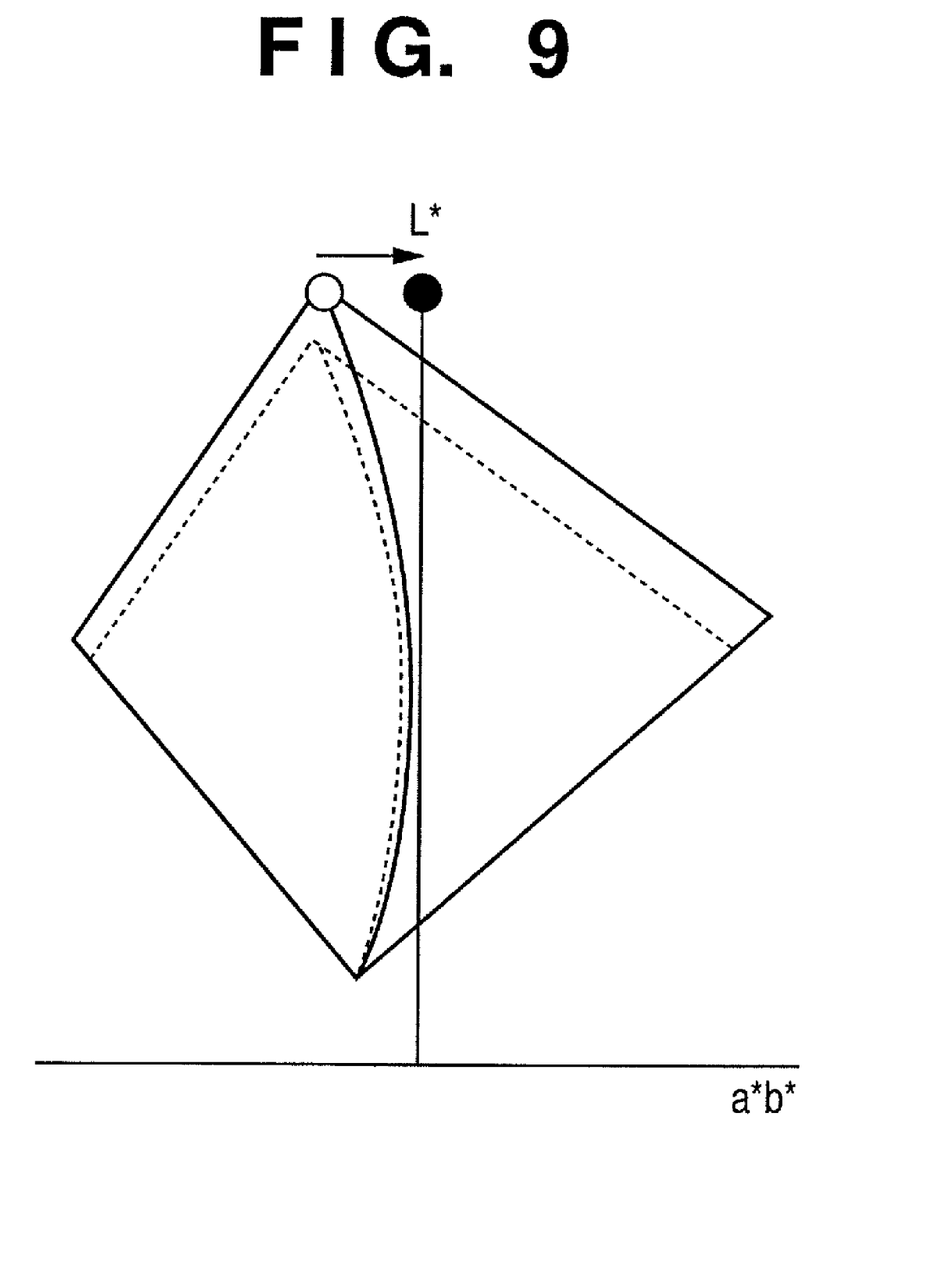
FIG. 9 is a view showing the under color removal of an input medium according to the present embodiment.

The technique shown in FIG. 8 reproduces an uncorrected white point OW on an output medium. In other words, the background color of the paper sheet of the input side is reflected on the image of the output side. To solve this problem, in the present embodiment, as shown in FIG. 9, the conversion characteristic look-up table generation unit 209 generates a conversion characteristic look-up table such that only the medium white point corrected to L*a*b*=100, OWa*,OWb* is corrected to L*a*b*=100,0,0. With this process, the background color of the paper sheet of the input side can be prevented from being reflected on the image of the output side.

Figure 10:
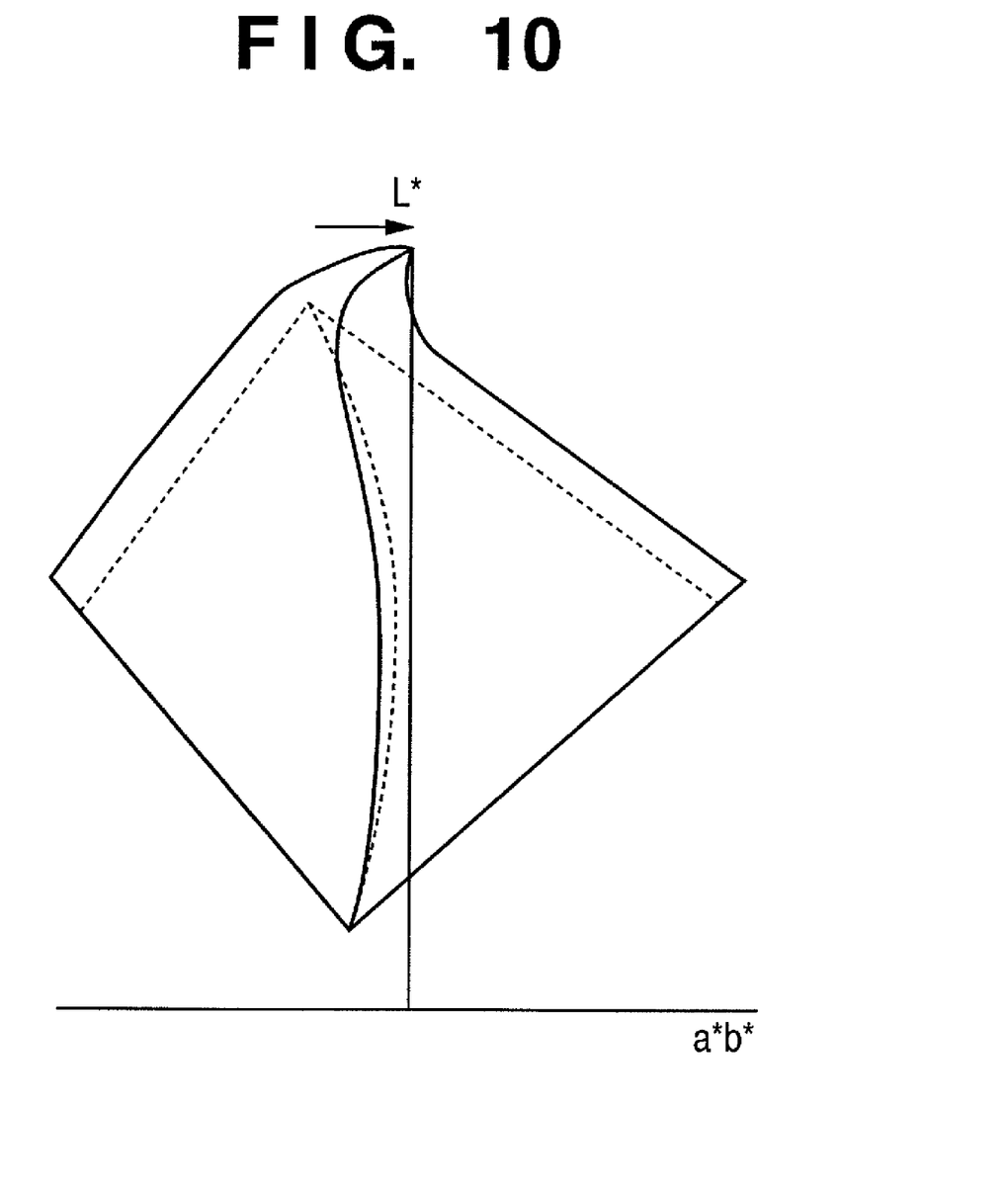
FIG. 10 is a view showing the correction considering the tone with a reference white point in the present embodiment.

However, the correction shown in FIG. 9 may deteriorate the tone of the highlight portion. To avoid this, the conversion characteristic look-up table generation unit 209 further performs correction such that not only the medium white point but also the colors near the white point (a predetermined value, e.g., L* is equal to more than 90) become smoothly continuous as a whole, as shown in FIG. 10. This correction can be implemented by setting the output values of the grid points for converting the image data converted near the white point by the source profile, to those which implement the characteristics in FIG. 10. As the method of smoothing the conversion curve near the white point, for example, a method of approximating the color signal look-up table on a Bezier surface or B-spline surface and transforming it by morphing and the like, and the method of expressing the color signal look-up table by the 3D finite element method to transform it can be assumed.

As described above, in the present embodiment, the conversion characteristic look-up table as shown in FIG. 10 is eventually generated. More specifically, the white and black correction parameters are generated such that the chromaticity coordinates of the corrected white point parameter remain the same as those of the uncorrected white point, and the conversion characteristic look-up table is corrected so as to convert only the white point into the reference white point and smooth the tone in the vicinity of the white point.

As has been described above, according to the present embodiment, the following effects can be obtained when the conversion characteristics between the device dependence color space and device independence color space are generated. When white and black correction of a colorimetric value is implemented as shown in FIG. 8, a shift of the gray line after correction can be reduced even in color matching performed when the white points of the input and output media are largely separated from each other. In addition, when the conversion characteristic look-up table is generated as shown FIG. 10, white and black correction independent from the characteristics of the input side can be implemented while maintaining the tone of the highlight portion.

The present invention can include an embodiment of, for example, a system, apparatus, method, program, storage medium (recording medium), or the like. More specifically, the present invention may be applied to a system made up of a plurality of devices (e.g., host computer, interface device, image sensing device, web application), or an apparatus formed from one device.

The present invention can be implemented by supplying a software program, which implements the functions of the above embodiment, directly or indirectly to a system or apparatus, reading the supplied program code with a computer of the system or apparatus, and then executing the program code.

Accordingly, the program code installed in the computer in order to implement the functional processing of the present invention by the computer also implements the present invention. In other words, the present invention also includes a computer program itself for the purpose of implementing the functional processing of the present invention.

In this case, so long as functions of the program are provided, they may be executed in any form, such as an object code, a program executed by an interpreter, or script data supplied to an OS.

Examples of storage media that can be used for supplying the program are a floppy (registered trademark) disk, a hard disk, an optical disk, a magneto-optical disk, an MO, a CD-ROM, a CD-R, a CD-RW, a magnetic tape, a non-volatile memory card, a ROM, and a DVD (DVD-ROM and DVD-R).

As for the method of supplying the program, a client computer can be connected to a homepage on the Internet using a browser of the client computer, and the computer program of the present invention (or an automatically-installable compressed file of the program) can be downloaded from the homepage to a recording medium such as a hard disk. Further, the program of the present invention can be supplied by dividing the program code constituting the program into a plurality of files and downloading the files from different homepages. In other words, a WWW server that downloads, to multiple users, the program files that implement the functional processing of the present invention by the computer is also included in the present invention.

It is also possible to encrypt and store the program of the present invention on a storage medium such as a CD-ROM, distribute the program to users, and allow users who meet certain requirements to download decryption key information from a homepage via the Internet. These users can decrypt the encrypted program by using the key information and install the program in the user computer.

The above functions according to the embodiment are implemented by executing the read program by computer. Furthermore, an OS or the like running on the computer may perform all or a part of the actual processing based on an instruction of the program so that the functions of the above embodiment can be implemented by this processing.

The functions of the above embodiment are also implemented when the program read from the storage medium is written to a function expansion board inserted into the computer or to a memory provided in a function expansion unit connected to the computer and the program is executed. More specifically, a CPU or the like mounted on the function expansion board or function expansion unit can perform all or a part of the actual processing on the basis of an instruction of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-160314, filed Jun. 8, 2006, which is hereby incorporated by reference herein in its entirety.

What is claimed is:

1. An image processing method comprising:
a color measurement step of colorimetrically measuring a chart of a device dependence color signal output by an output device so as to obtain a first device independence color signal;
a white and black correction step of performing white and black correction for the first device independence color signal to obtain a second device independence color signal; and
a conversion characteristic look-up-table generation step of generating a conversion characteristic look-up table by correcting a chromaticity component of a white point of the second device independence color signal to a reference white point on a device independence color space and by making the reference white point of the second device independence color signal smoothly continue to other grid points,
wherein in the white and black correction step, white and black correction is performed so as to maintain a chromaticity component of a white point of the first device independence color signal in the second device independence color signal.

2. The method according to claim 1, wherein in the white and black correction step, a white point and a black point of the first device independence color signal and a white point and a black point of the second device independence color signal are determined as correction parameters.

3. The method according to claim 1, wherein in the white and black correction step, white and black correction based on a chromatic adaptation model and color appearance model is performed.

4. An image processing apparatus comprising:
a color measurement unit configured to colorimetrically measure a chart of a device dependence color signal output by an output device so as to obtain a first device independence color signal;
a white and black correction unit configured to perform white and black correction for the first device independence color signal to obtain a second device independence color signal; and
a conversion characteristic look-up-table generation unit configured to generate a conversion characteristic look-up table by correcting a chromaticity component of a white point of the second device independence color signal to a reference white point on a device independence color space and by making the reference white point of the second device independence color signal smoothly continue to other grid points;
wherein said white and black correction unit performs white and black correction so as to maintain a chromaticity component of a white point of the first device independence color signal in the second device independence color signal.

5. A storage medium storing, in a computer-readable form, a computer program that realizes an image processing method, wherein said computer program causes a computer to execute:

a color measurement step of colorimetrically measuring a chart of a device dependence color signal output by an output device so as to obtain a first device independence color signal;

a white and black correction step of performing white and black correction for the first device independence color signal to obtain a second device independence color signal; and a conversion characteristic look-up-table generation step of generating a conversion characteristic look-up table by correcting a chromaticity component of a white point of the second device independence color signal to a reference white point on a device independence color space and by making the reference white point of the second device independence color signal smoothly continue to other grid points, wherein in the white and black correction step, white and black correction is performed so as to maintain a chromaticity component of a white point of the first device independence color signal in the second device independence color signal.

* * * * *